(12) United States Patent
Jung et al.

(10) Patent No.: US 9,900,644 B2
(45) Date of Patent: Feb. 20, 2018

(54) DEVICE AND METHOD FOR PROCESSING AN OBJECT WHICH PROVIDES ADDITIONAL SERVICE IN CONNECTION WITH A BROADCAST SERVICE IN A BROADCAST RECEIVING DEVICE

(71) Applicant: SAMSUNG ELECTRONICS CO., LTD., Suwon-si (KR)

(72) Inventors: Bo-sun Jung, Yongin-si (KR); Sung-oh Hwang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 14/351,760

(22) PCT Filed: Oct. 12, 2012

(86) PCT No.: PCT/KR2012/008309
§ 371 (c)(1),
(2) Date: Apr. 14, 2014

(87) PCT Pub. No.: WO2013/055146
PCT Pub. Date: Apr. 18, 2013

(65) Prior Publication Data
US 2014/0282740 A1 Sep. 18, 2014

Related U.S. Application Data

(60) Provisional application No. 61/546,768, filed on Oct. 13, 2011.

(51) Int. Cl.
*G06F 3/00* (2006.01)
*H04N 21/41* (2011.01)
(Continued)

(52) U.S. Cl.
CPC ..... *H04N 21/4126* (2013.01); *H04N 21/4222* (2013.01); *H04N 21/43* (2013.01); *H04N 21/4348* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 7,047,302 B1 | 5/2006 | Chatani et al. | |
| 8,490,140 B2 * | 7/2013 | Yuasa et al. | 725/80 |

(Continued)

FOREIGN PATENT DOCUMENTS

| | | |
|---|---|---|
| KR | 10-2006-0020420 A | 3/2006 |
| KR | 10-2006-0070778 A | 6/2006 |

(Continued)

OTHER PUBLICATIONS

Willkie, John M. Program map table (PMT) [online]. 2010 [retrieved on Jul. 30, 2015]. Retrieved from the Internet: <URL: http://www.etherguidesystems.com/help/sdos/mpeg/syntax/tablesections/pmts.aspx>.*

(Continued)

*Primary Examiner* — Jason K Lin
(74) *Attorney, Agent, or Firm* — Sughrue Mion, PLLC

(57) ABSTRACT

The present invention relates to a method of processing an object for an ancillary service associated with a broadcast service. A broadcast receiver establishes a session with surrounding sub device before an object execution time and transfers an object to the sub device with reference to a trigger or an EPG including object-related information when it becomes the object execution time. The sub device executes the object. According to the present invention, a user can use a broadcast service through the broadcast receiver, and an ancillary service associated with the broad- (Continued)

cast service through a sub device such as a smart phone or a tablet.

21 Claims, 9 Drawing Sheets

(51) Int. Cl.
*H04N 21/43* (2011.01)
*H04N 21/422* (2011.01)
*H04N 21/482* (2011.01)
*H04N 21/434* (2011.01)

(56) References Cited

U.S. PATENT DOCUMENTS

| | | | |
|---|---|---|---|
| 8,978,070 | B2 | 3/2015 | Matsuda |
| 2005/0055716 | A1* | 3/2005 | Louie ................... G06F 1/1632 725/58 |
| 2006/0130107 | A1* | 6/2006 | Gonder et al. ............... 725/110 |
| 2006/0184965 | A1 | 8/2006 | Lee et al. |
| 2006/0236232 | A1* | 10/2006 | Yuasa .................... H04N 7/163 715/203 |
| 2007/0250901 | A1* | 10/2007 | McIntire et al. .............. 725/146 |
| 2009/0083803 | A1 | 3/2009 | Alshaykh et al. |
| 2010/0247061 | A1* | 9/2010 | Bennett et al. ................ 386/52 |
| 2010/0293598 | A1* | 11/2010 | Collart et al. .................... 726/3 |
| 2012/0054816 | A1* | 3/2012 | Dewa ............... H04N 21/25816 725/116 |
| 2012/0060100 | A1* | 3/2012 | Sherwood .......... H04N 21/4122 715/748 |
| 2013/0183021 | A1* | 7/2013 | Osman .................... H04N 9/87 386/239 |
| 2014/0032636 | A1* | 1/2014 | Nelson ......................... 709/203 |

FOREIGN PATENT DOCUMENTS

| | | | |
|---|---|---|---|
| KR | 10-2011-0053683 A | | 5/2011 |
| TW | 200307461 A | | 12/2003 |
| TW | 200803490 | | 1/2008 |
| WO | WO 99/43159 | * | 8/1999 |
| WO | WO 2011043016 A1 | * | 4/2011 |

OTHER PUBLICATIONS

International Search Report (PCT/ISA/210), dated Feb. 26, 2013, issued by the International Searching Authority in counterpart International Patent Application No. PCT/KR2012/008309.

Written Opinion (PCT/ISA/237), dated Feb. 26, 2013, issued by the International Searching Authority in counterpart International Patent Application No. PCT/KR2012/008309.

Communication dated Aug. 15, 2016 issued by the Taiwanese Patent Office in counterpart Taiwanese Patent Application No. 101137896.

* cited by examiner

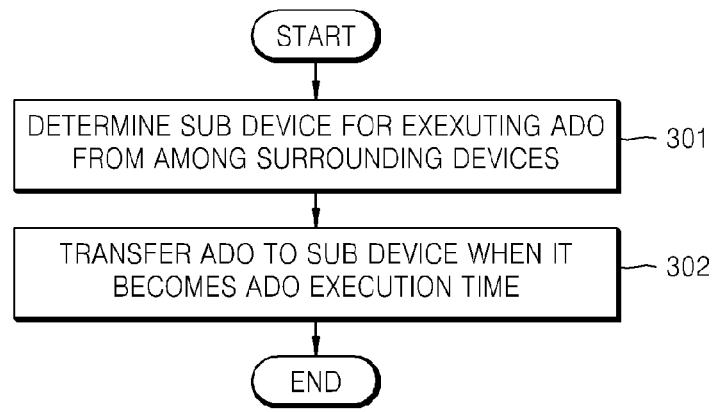
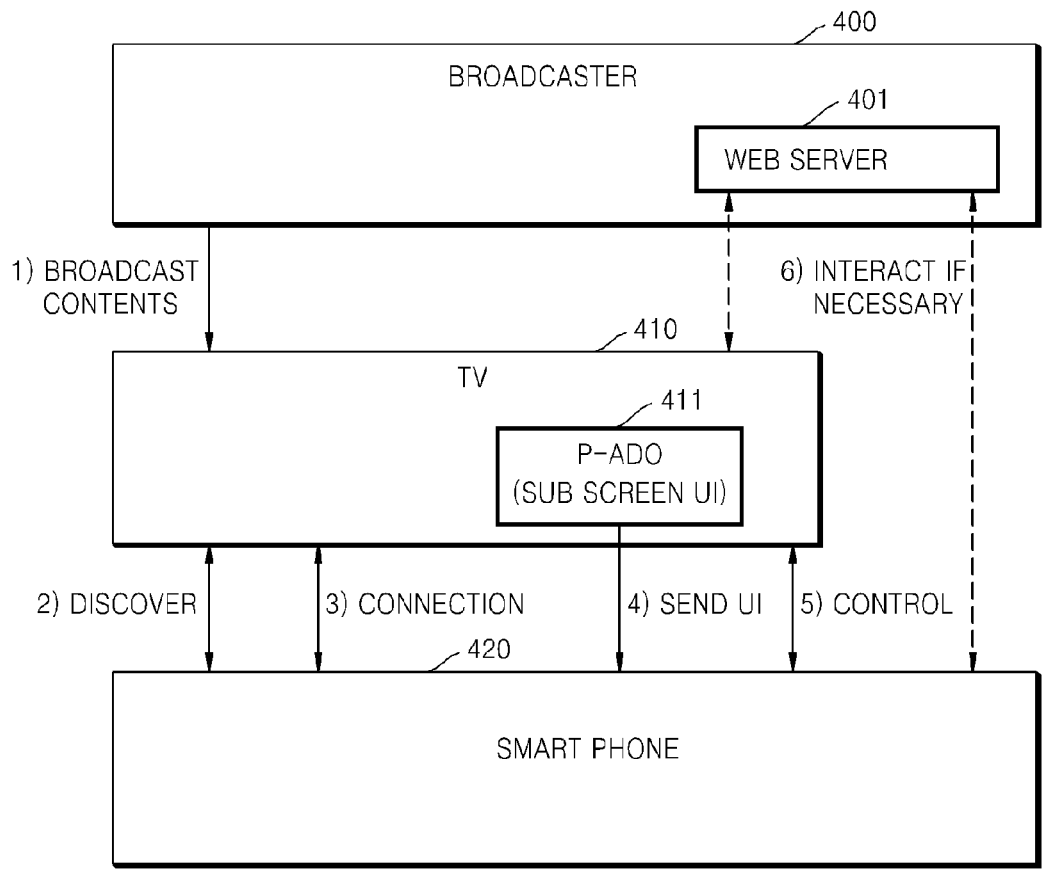

FIG. 5

| PARAMETER | | DESCRIPTION |
|---|---|---|
| ADOTable_id | | TABLE IDENTIFIER FOR PROVIDING ADO INFORMATION |
| Version_id | | ADO TABLE VERSION |
| Table_length | | ADO TABLE LENGTH |
| ADO_number | | NUMBER OF ADO ASSOCIATED WITH BROADCAST SERVICE |
| Service_Link | | BROADCASR SERVICE IDENTIFIER TO BE ASSOCIATED WITH ADO INDICATED BY ADO TABLE |
| ADO_type | | INDICATE KIND AMONG S-ADO, P-ADO AND 3RD PARTY ADO |
| ADO_id | | ADO IDENTIFIER |
| ADO_locator | | INFORMATION NECESSRAY TO RECEIVE ADO |
| Execution_attribute | Execution Time | ADO EXECUTION TIME |
| | Display_place | INFORMATION ON DISPLAY TO PRESENT ADO |
| | Resolution | RECOMMENDED RESOLUTION OF DISPLAY TO PRESENT ADO |
| | Secure_execution | INDICATE THAT SECURITY IS NECESSARY IN ADO EXECUTION |
| | ADO_priority | RELATIVE PRIORITY WHEN MULTIPLE ADOS ARE EXECUTED |

DEVICE AND METHOD FOR PROCESSING AN OBJECT WHICH PROVIDES ADDITIONAL SERVICE IN CONNECTION WITH A BROADCAST SERVICE IN A BROADCAST RECEIVING DEVICE

CROSS-REFERENCE TO RELATED APPLICATIONS

This application claims benefit under 35 U.S.C. § 119(a) from U.S. Provisional Patent Application No. 61/546,768, filed Oct. 13, 2011 and is a National Stage Application of PCT/KR2012/008309, filed on Oct. 12, 2012, the disclosures of which are incorporated herein by reference, in their entireties.

TECHNICAL FIELD

Methods and devices according to the exemplary embodiments relate to a method and apparatus for processing an object for an ancillary service associated with a broadcast service in a broadcast receiver.

DESCRIPTION OF THE RELATED ART

Generally, broadcast services are provided to all users who have terminals. These broadcast services are divided into audio-oriented broadcast services, such as radio broadcasts providing only audio services, video-oriented broadcast services such as televisions for providing audio and video services, and multimedia broadcast services including audio, video and data services. These broadcast services are based on analog related art and become digitalized as technology develops. In addition, the broadcast services are being developed in various ways including providing a multimedia service which delivers high quality data at high speed through a wired network, providing the multimedia service through a satellite, and providing the multimedia service through the satellite and the wired network, as getting away from providing the multimedia service on the basis of the transmitting tower.

The mobile communication market is continuously required to produce a new service through recombination or integration of the related art technologies. Due to development of the communication and broadcast technologies, the mobile communication market is nowadays in a stage where the broadcast is serviced through a mobile terminal such as a mobile phone or a personal digital assistant (PDA) in the related art broadcast system or in the mobile communication system. Convergence of the mobile communication service and IP has become a big trend while potential and actual market demand, rapid increase of user demand on the multimedia service, service provider's strategy to provide a new service such as a broadcast service in addition to the related art audio service, and interests of IT companies which bolster their mobile communication business according to the user's demand for interconnection. Accordingly, various services existing in a wireless service or in a broadcast service are introduced and applied to the general wired communication market as well as the mobile communication market, and this omni-directional convergence creates an identical consumption environment for various services, regardless of the wired and wireless broadcasts.

FIG. 1 illustrates a configuration of a digital broadcast system in the related art.

As illustrated in FIG. 1, the digital broadcast system includes a source coding/compression unit 110 and 120 for encoding to compress data, such as video or audio, a multiplexing/transporting unit 130 for multiplexing various datastreams such as video, audio, control data and ancillary data, an RF transmission system unit 140 for finally transmitting a broadcast signal to a terrestrial medium, a satellite or a cable. A signal transmitted by the digital broadcast system is received by a digital broadcast receiver 150 of a user.

The digital broadcast signal includes the ancillary data and the control data in addition to the audio and video data. As the ancillary and control data, a Triggered Downloadable Object (TDO) may be used. The TDO is information used for providing an ancillary service associated with a broadcast service in the ATSC. The TDO is generally downloaded with broadcast content through a broadcast network and provides the user with the ancillary service by being executed in a TV in response to a message called a trigger being received. For example, the user may use information or an application associated with the broadcast service using the TDO on a TV screen through a pop-up window or a screen transition.

The TDO is executed in and displayed only on the user's TV. Accordingly, the ancillary service associated with the broadcast service is also able to be used only through the TV screen in the related art. Therefore, the user does not have any way to be serviced by the ancillary service through a mobile terminal, such as a mobile phone or a tablet.

SUMMARY

The exemplary embodiments provide a method and apparatus for enabling a user to execute and use, through a mobile sub device, an object such as a TDO which is generally executed in a broadcast receiving apparatus and provides an ancillary service associated with a broadcast service.

According to an exemplary embodiment, a user may use the broadcast service by using a broadcast receiving apparatus, and use the ancillary service associated with a broadcast service through a mobile sub device, such as a mobile phone or a tablet.

According to an aspect of the exemplary embodiments, there is provided a method of processing an Auxiliary Downloadable Object (ADO) by a broadcast receiver, the method includes determining a sub device to execute the ADO from among devices which surround the broadcast receiver; and transferring the ADO to the sub device in response to the ADO becoming an execution time designated in an ADO table including information related to the ADO, wherein the ADO is an object providing an ancillary service associated with the broadcast service.

The method of processing the ADO may further include establishing a session for transferring the ADO with the sub device prior to the execution time.

The method of processing the ADO may further include performing a command received through the ADO from the sub device, wherein the ADO may include User Interface (UI) data which provides a screen to control the broadcast receiver by a user.

The ADO table may be included in an Electronic Program Guide (EPG) or a trigger of the ADO.

The ADO table may include information on whether the ADO is a P-ADO specialized for a broadcast company, or an S-ADO specialized for broadcast content and information on which one of the P-ADO and the S-ADO has a priority.

The method of processing the ADO may further include selectively displaying an execution screen of the ADO with reference to the ADO table, wherein the ADO table may include information on which one of the broadcast receiver and the sub device is used to display the ADO execution screen.

The ADO table may include information on a recommended resolution for the ADO execution and the determining of the sub device may be performed with reference to the included information.

According to another aspect of the exemplary embodiments, a non-transitory computer readable storage medium is provided to enable a computer to execute the method described above.

According to still another aspect of the exemplary embodiments, there is provided a broadcast receiver which includes at least one memory for processing an ADO; and a processor to execute at least one computer program stored in the memory, wherein the at least one computer program includes instructions for: determining a sub device for executing the ADO from among devices which surround the broadcast receiver; and transferring the ADO to the sub device in response to the ADO becoming an execution time designated in an ADO table including information related to the ADO, and wherein the ADO is an object providing an ancillary service associated with the broadcast service.

The at least one program may further include instructions for establishing a session to deliver the ADO with the sub device prior to the execution time.

The at least one program may further include instructions for executing commands received through the ADO from the sub device, and the ADO may be UI data which provides a user with a screen for controlling the broadcast receiver.

The ADO table may be included in an EPG or a trigger of the ADO. The ADO table may include information related to whether the ADO is a P-ADO specialized for a broadcast company or an S-ADO specialized for broadcast content and information on which one of the P-ADO and the S-ADO has a priority.

The at least one program may further include instructions for performing selectively displaying an execution screen of the ADO with reference to the ADO table, and the ADO table may include information on which one of the broadcast receiver and the sub device is used in order to display the ADO execution screen.

The ADO table may include information related to a recommended resolution for the ADO execution; and the determining of the sub device may be performed with reference to the information related to a recommended solution.

An aspect of an exemplary embodiment may provide a system including a broadcast receiver and a sub device for processing an ADO, the system including: a sub device for executing the ADO; the broadcast receiver including: a processor configured to execute at least one computer program stored in a memory, wherein the at least one computer program comprises instructions for: determining the sub device to execute the ADO from among devices surrounding the broadcast receiver; and transferring the ADO to the sub device in response to the time becoming an execution time designated in an ADO table including information related to the ADO, and wherein the ADO is an object providing an ancillary service associated with the broadcast service.

The system further includes at least one memory; wherein the processor is configured to execute the computer program stored in the memory.

The at least one program further includes instructions for executing commands received through the ADO from the sub device, and the ADO is UI data providing a user with a screen for controlling the broadcast receiver.

The ADO table is included in an EPG or a trigger of the ADO.

The ADO table includes information on whether the ADO is a P-ADO specialized for a broadcast company or an S-ADO specialized for broadcast content and information on which one of the P-ADO and the S-ADO has priority.

BRIEF DESCRIPTION OF THE DRAWINGS

FIG. 3 is a flow chart which illustrates a process of processing ADO in the broadcast receiver, according to an exemplary embodiment;

FIGS. 4a to 4b illustrate a kind of ADO, according to an exemplary embodiment;

FIG. 5 illustrates an ADO table according to an exemplary embodiment;

DETAILED DESCRIPTION OF THE EXEMPLARY EMBODIMENTS

Hereinafter, the exemplary embodiments will be described in detail.

Figure 1:
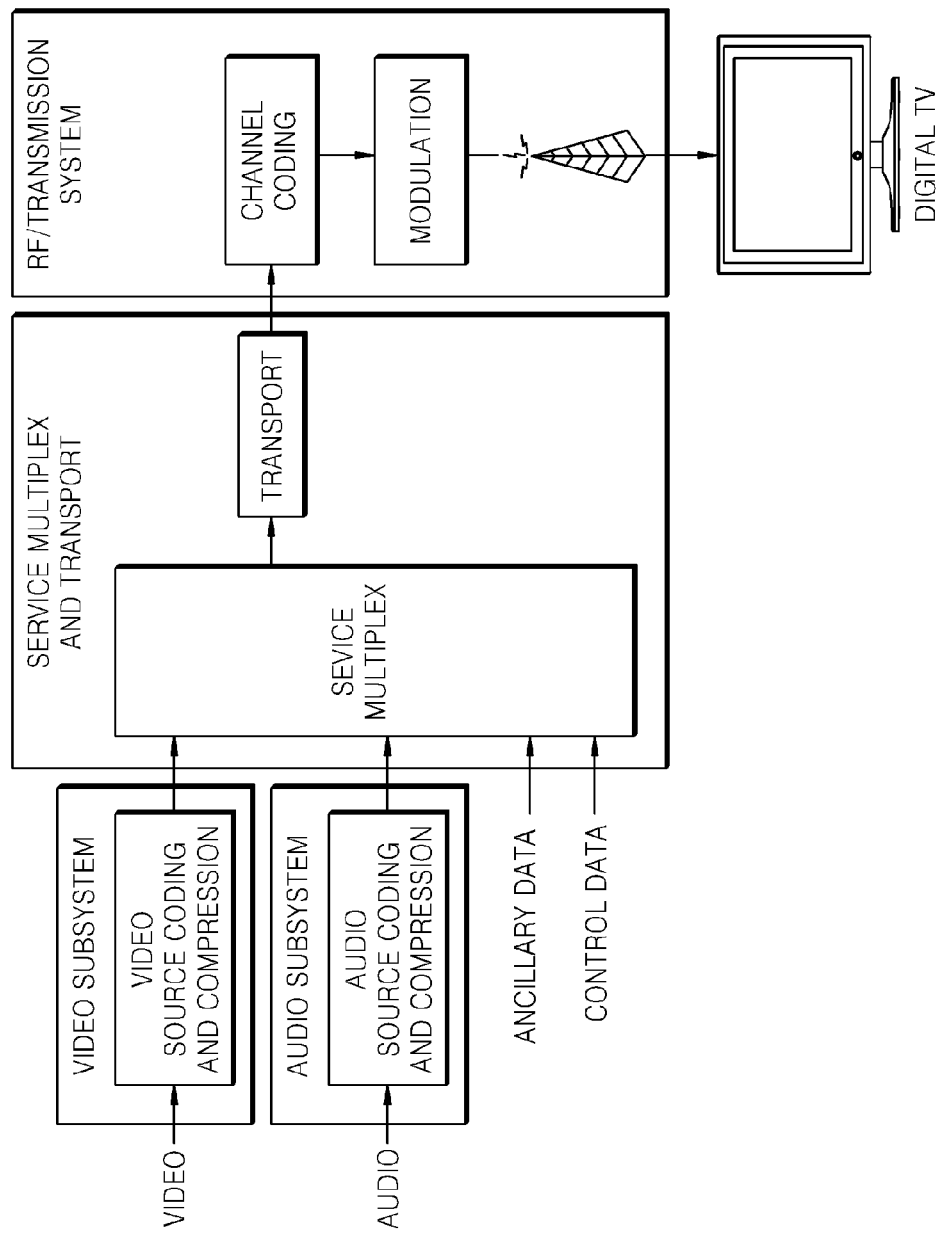
FIG. 1 illustrates a configuration of a general digital broadcast system of the related art.
Figure 2:
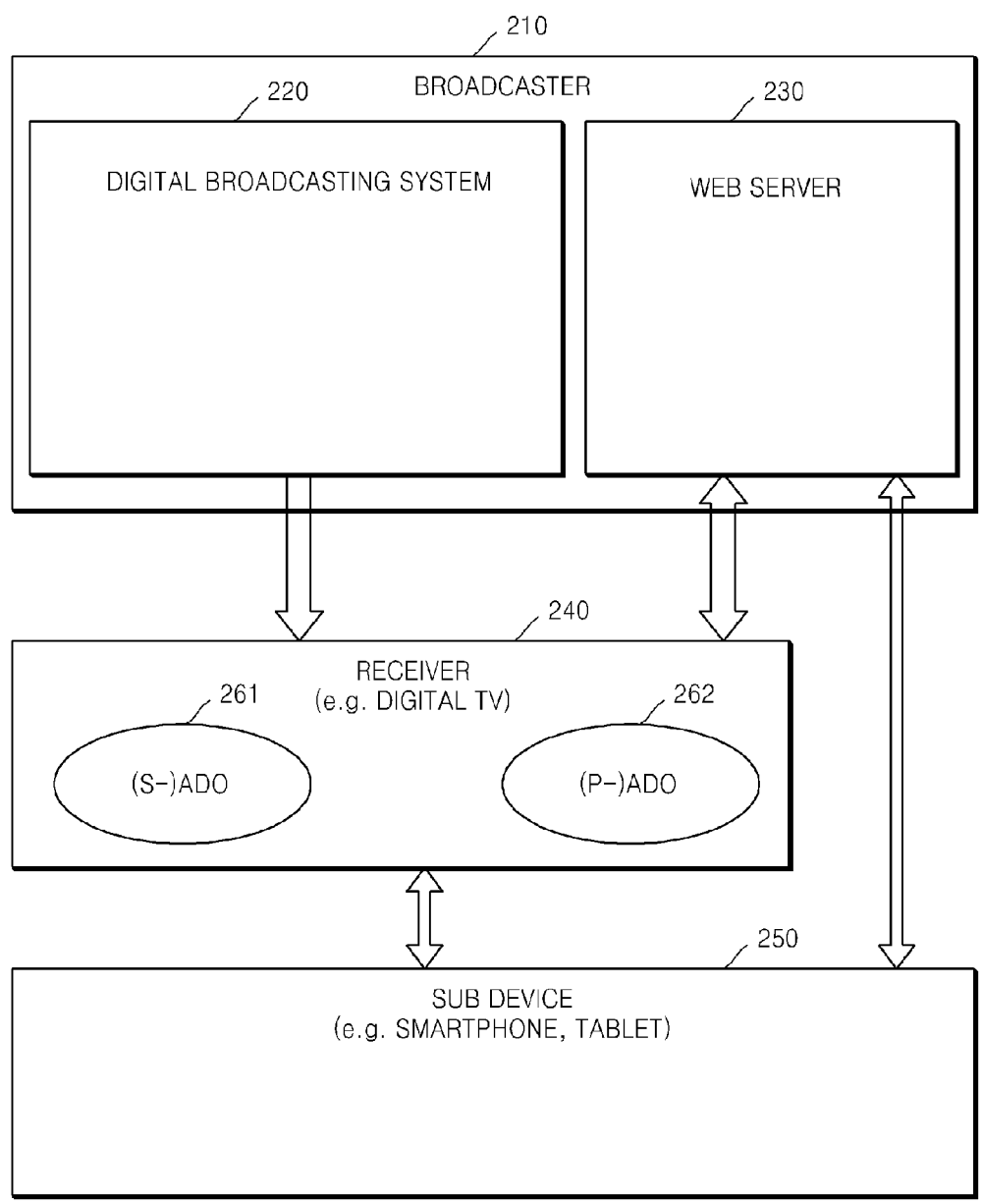
FIG. 2 is a conceptual diagram illustrating a method of processing an ADO according to an exemplary embodiment.

FIG. 2 is a conceptual diagram which illustrates a method of processing an ADO according to an exemplary embodiment.

As illustrated in FIG. 2, a broadcaster 210 provides broadcast contents to a receiver 240 of a user through a digital broadcast system 220. The receiver 240 generally indicates a digital TV of a user. However the receiver 240 is a generic concept meaning a device for receiving a broadcast signal through a broadcast network and processing the received broadcast signal, and is not limited to the digital TV. Hereinafter, the broadcast receiver will be used as having the same meaning as a TV for convenience of description. Ancillary data, such as an Electronic Program Guide (EPG), an ADO or a trigger which is a message requesting execution of an ADO may be provided through a broadcast network, or through a separate web server 230.

In the exemplary embodiments, an Auxiliary Downloadable Object (ADO) is proposed. The ADO is an object providing an ancillary service associated with the broadcast service, as the TDO; and is also an object which is not executed in the broadcast receiver 240 but is transferred by the broadcast receiver 240 to a surrounding sub device 250 and executed by the sib device 250. The ADO may be implemented as an application or a declarative object created by a web-based technologies such as Hyper Text Markup Language (HTML) or Cascading Style Sheets (CSS).

The ADO may be classified as one kind of the TDO because the ADO is almost the same as the TDO with the exception that a main execution agent thereof is a sub device. However, the ADO does not necessarily have the same format as the TDO since the TDO is a term defined in the ATSC, which is a terrestrial broadcast standard in North America. Finally, any object to be executed in order to provide the user with the ancillary service associated with the broadcast service may be included in an ADO category.

The ADO may be provided largely in two types of a Predefined ADO (P-ADO) 262 and a Service-specific ADO (S-ADO) 261. The P-ADO indicates an ADO in which it is necessary to use an ancillary service provided in a specific broadcast company, and may be applied to a broadcast service with which the corresponding broadcast company provides, regardless of a kind of broadcasting program or content. The S-ADO indicates an ADO used for providing a specialized ancillary service in relation to a broadcast program or content specified by the broadcast company. The P-ADO and S-ADO may be discriminated by being implemented as different kinds of objects or inserting discrimination information in the ADO.

In response to receiving the ADO, the broadcast receiver 240 transfers the ADO to the sub device 250, such as a smart phone or a tablet, and causes the sub device 250 to execute the ADO. Accordingly the user may use the broadcast service through the broadcast receiver 240, such as a TV, and use the ancillary service through the sub device 250. For example, the sub device 250 may provide the user with a remote control UI which is necessary to control the broadcast receiver 240 with the sub device 250, an advertisement related to the broadcast service, purchase information on a product displayed on a screen of the broadcast receiver 240, weather or news, or an EPG providing detailed information related to broadcast programs. The user may use the ancillary service through the sub device 250. The sub device 250 may transfer a command to the broadcast receiver 240 and directly communicate with the web server 230 in the broadcaster through the ancillary service.

The broadcast receiver 240 may receive the ADO with broadcast content through the broadcast network and download the ADO from an internet address designated in an ADO table including ADO-related information.

The ADO table is included in the EPG or the trigger and may be received through a Digital Storage Media Command and Control (DSM-CC) channel. The ADO table will be described in detail in relation to FIG. 5. The trigger is data including ADO-related information such as an ADO execution time or connection information used for downloading the ADO and is received through the broadcast network. In response to receiving the trigger, the broadcast receiver 240 downloads the ADO with reference to the connection information included in the trigger. However, the ADO may be previously downloaded with the broadcast contents prior to the trigger being received. In particular, the P-ADO may be previously included in the broadcast receiver 240 and released. Otherwise, the P-ADO is preferably and previously downloaded prior to receiving the broadcast content and stored in a memory within the broadcast receiver 240, because the P-ADO may be associated with all of the broadcast contents provided by a predetermined broadcast company.

FIG. 3 is a flow chart which illustrates a process of processing the ADO in the broadcast receiver, according to an exemplary embodiment.

In operation 301, the broadcast receiver determines a sub device to execute the ADO. In the surroundings of the broadcast receiver, various user devices, such as a mobile phone or a tablet may exist. The broadcast receiver performs a discovery process for the surrounding devices, determines which device will be used as a sub device and then previously establishes a session with the determined sub device prior to the ADO execution time. That is because with the ADO it is necessary to be immediately transferred to the sub device at the ADO execution time. In the processes of discovery, session establishment, and then message transmission and reception between the broadcast receiver and the sub device, various communication protocols such as the Wi-Fi, the Bluetooth®, the Universal Plug and Play (UPnP) may be used, and the kind of protocol is not limited thereto.

In the sub device determination operation, it is necessary to consider that a resource of the sub device is suitable to execute the corresponding ADO. For this, the ADO table preferably includes information related to a recommended resolution for the corresponding ADO execution. The broadcast may determine the sub device with reference to the ADO table. For example, in response to the surrounding devices, which may be the sub devices, being discovered, the broadcast receiver displays a list of devices which support a resolution of the recommended resolution or more on a screen of the broadcast receiver, and finally determines the sub device according to a user's input from among the displayed list of devices.

In operation 302, the broadcast receiver transfers the ADO to the sub device at the time the ADO is executed. The sub device executes the ADO and displays an ADO execution screen to a display of the sub device and the user may use the broadcast service through the broadcast receiver and the ancillary service through the sub device.

Meanwhile, the ADO execution screen may be displayed in the broadcast receiver or in both of the broadcast receiver and the sub device. For this case, the ADO table preferably includes information on which one of the broadcast receiver and the sub device displays the ADO and the broadcast receiver selectively displays the ADO execution screen with reference to the information.

Figure 4B:
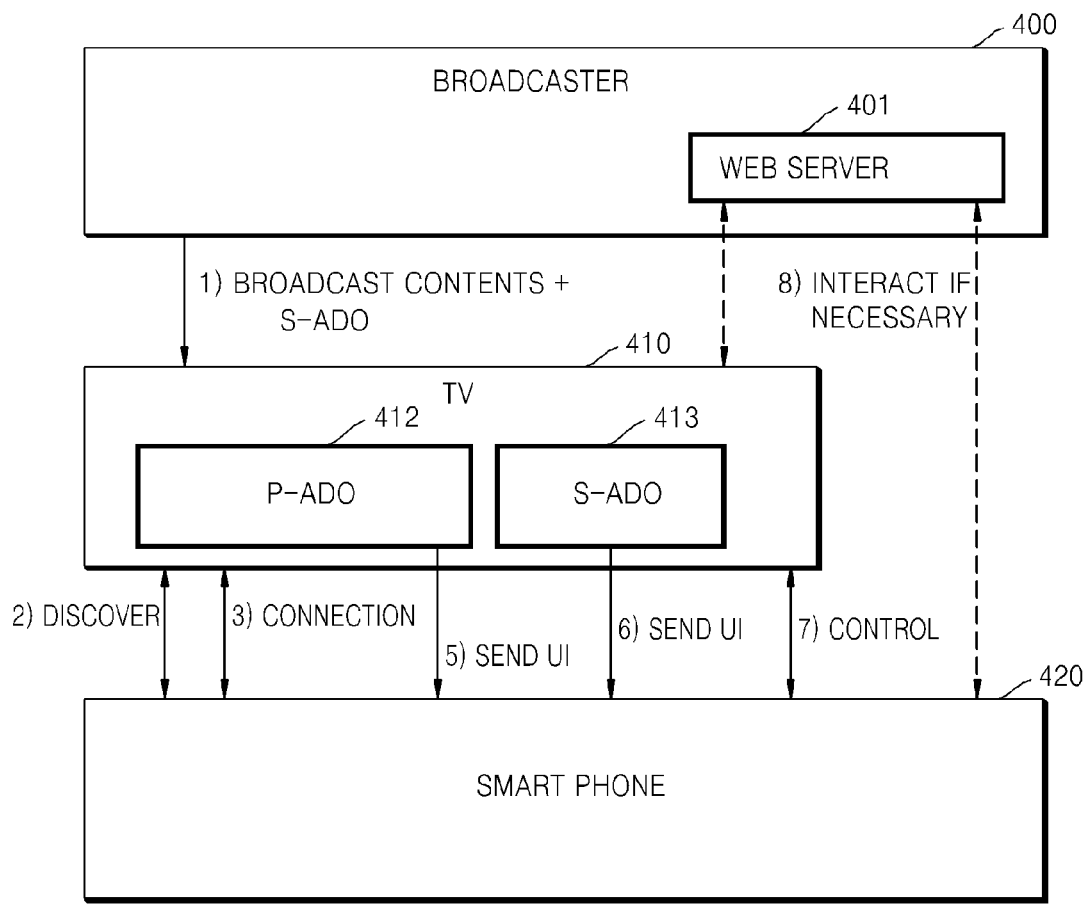

FIGS. 4a to 4b illustrate a kind of ADO according to an exemplary embodiment.

As described above, the ADO according to an exemplary embodiment may be discriminated into an S-ADO specialized for a predetermined broadcast company and a P-ADO specialized for predetermined broadcast content. FIG. 4a illustrates an embodiment of the P-ADO, FIG. 4b illustrates an embodiment of the S-ADO.

As illustrated in FIG. 4a, a TV 410 receives broadcast content from a broadcast company 400. At this time, the TV 410 preferably and previously stores P-ADO 411 specialized for the corresponding broadcast company 400 before using a broadcast service of the broadcast company 400. The P-ADO 411 may be previously downloaded by the TV 410 from the web server 401 or may be included in a TV during manufacture and then released.

The TV 410 performs the discovery and establishment processes with a smart phone 420 prior to the ADO execution time specified in the trigger or the EPG. In response to it becoming the ADO execution time, the TV 410 transfers UI data, namely, P-ADO 411 to the smart phone 420. Accordingly, the user may use the ancillary service related to the broadcast service provided by the broadcast company 400 through the smart phone 420. For example, the user may control the TV 410 through the P-ADO 411 and directly communicate with the web server 401 of the broadcast company 400.

In FIG. 4a, a communication protocol used to perform operations 2 to 5 is not limited to a specific protocol. For example, operations 2 to 5 may be performed by using the UPnP and at this time, the TV 410 may operate as an UPnP Remote User Interface (RUI) server and the smart phone 420 may operate as a UPnP RUI client.

FIG. 4b illustrates an exemplary embodiment of S-ADO. As illustrated in FIG. 4b, the P-ADO 412 is previously stored in the TV 410 and the TV 410 receives S-ADO 413 which provides an ancillary service related to specific broadcast content with the broadcast content from the broadcast company 400. The TV 410 performs discovery and establishment processes with the smart phone 420 prior to the ADO execution time specified in the trigger or the EPG, and transfers the P-ADO 412 to the smart phone 420 in response to it being the P-ADO execution time. In addition, in response to the time being the S-ADO execution time, the TV 410 transfers the S-ADO 413 to the smart phone 420.

As described above, since the P-ADO 412 is not a predetermined broadcast program but an ADO specialized for all the broadcast contents, the TV 410 preferably and previously downloads the P-ADO 412 prior to receiving the broadcast content. To the contrary, the S-ADO 413 is preferably downloaded with the corresponding broadcast content because the S-ADO 413 is an ADO specialized for broadcast content. For example, the P-ADO 412 may provide a UI which enables the user to transmit suggestions to the broadcast company 400. The S-ADO 413 may provide a UI which enables the user to transmit a viewer's evaluation for a predetermined broadcast program.

A communication protocol used for performing operations 2 to 7 in FIG. 4b is not limited to a specific protocol. For example, operations 2 to 7 may be performed using the UPnP, and at this time the TV 410 operates as a UPnP RUI server and the smart phone 420 operates as a UPnP RUI client.

FIG. 5 illustrates the ADO table according to an exemplary embodiment.

The ADO table illustrated in FIG. 5 includes ADO-related information, and parameters of the ADO table may be included in the EPG or the trigger. The parameters included in the ADO table are not limited to ones shown in FIG. 5. Namely, a portion of the parameters in FIG. 5 may be omitted or other parameters may be further included. A person skilled in the art may easily understand meanings of the parameters through the description in relation to FIG. 5.

ADOTable_id indicates an identifier of the ADO table and Service_Link indicates an identifier of a broadcast service associated with the ADO table. Both of the two parameters may be represented as bit numbers or URLs.

ADO_type indicates whether the ADO is P-ADO or S-ADO and may indicate, in a supplemental manner, a kind of ancillary service with which the ADO provides. For example, upper 4 bits of 16 bits represent an ADO format and lower 12 bits represent a kind of ancillary service with which the ADO provides.

ADO_locator indicates connection information through which the ADO may be received, and may be an identifier representing a broadcast channel or may be a URL.

Execution Time, Display-place, Resolution, Secure_execution, and ADO_priority represent an execution environment of the ADO. Display_place represents that the execution screen of the ADO is to be displayed in the broadcast receiver, in the sub device or in both of the broadcast receiver and the sub device. The broadcast receiver selectively displays the ADO execution screen on the display with reference to this parameter when executing the ADO.

Resolution indicates a recommended resolution of the display where the ADO is to be displayed.

Secure_execution indicates whether security is secured in the ADO execution. For example, in a case of an ADO which performs an internet purchase, it is necessary that the security be secured. Accordingly, the broadcast receiver or the sub device may request a user's password when executing the ADO.

ADO_priority indicates which one is executed when both P-ADO and S-ADO exist for the same broadcast content. Generally, the S-ADO is preferably and preferentially executed than the P-ADO.

Figure 6:
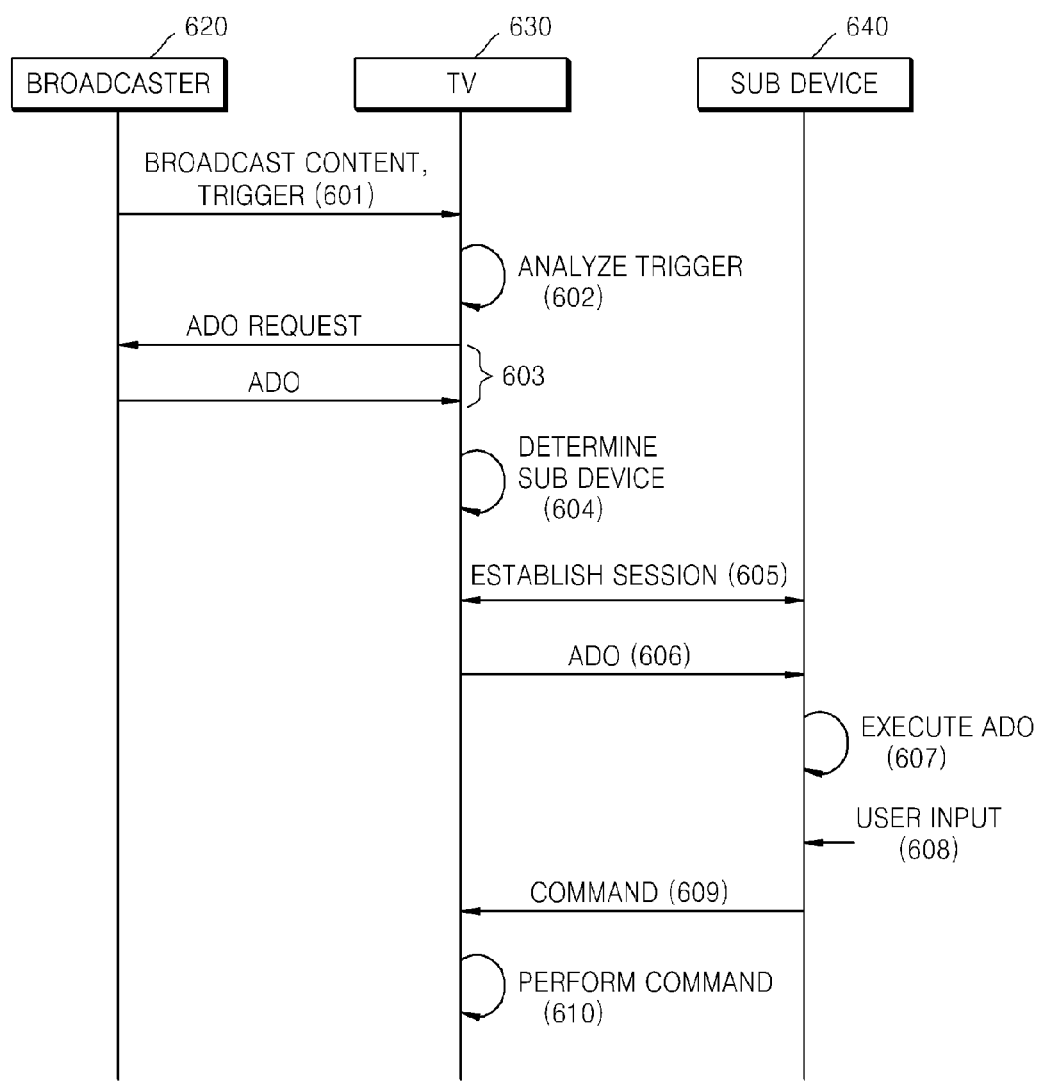
FIG. 6 is a signal flow chart which illustrates an operation where a user uses an ancillary service through a sub device, according to an exemplary embodiment.

FIG. 6 is a signal flow chart which illustrates a process that a user uses as an ancillary service using a sub device, according to an exemplary embodiment.

In operation 601, a TV 630 receives broadcast content, an EPG and a trigger. The EPG and the trigger may be received through a broadcast network or the internet.

In operation 602, the TV 630 analyzes the trigger, namely, the parameters written in the ADO table in FIG. 5.

In operation 603, the TV 630 may download the ADO with reference to the ADO connection information of the trigger. The ADO may be previously downloaded and stored in the TV 630 prior to the time that operation 601 is performed.

In operation 604, the TV 630 determines a sub device to which the ancillary service associated with the broadcast content is provided. At this operation, a resolution parameter in the ADO table may be referred to.

In operation 605, the TV 630 establishes a session with the sub device 640.

In operation 606, the TV 630 transfers the ADO to the sub device 640 in response to the time being the ADO execution time.

In operation 607, the sub device 640 executes the ADO and displays an ADO execution screen on a display of the sub device 640.

In operation 608, the user controls the TV 630 by transmitting a command to the TV 630 through the ADO executed in the sub device 640. For example, the ADO in this operation may be UI data with which the user controls the TV 630 through the sub device 640.

In operation 609, the TV 630 performs a command received through the ADO.

Figure 7A:
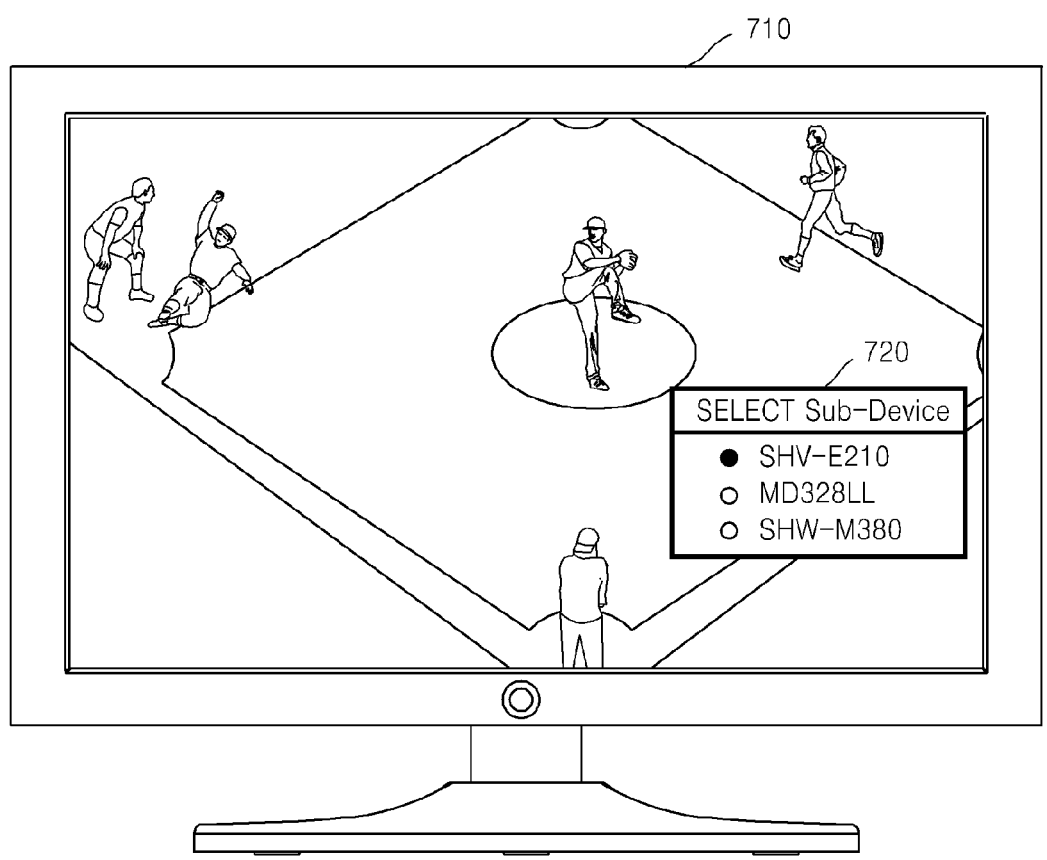
FIGS. 7a to 7c illustrate screens of a broadcast receiver and a sub device according an exemplary embodiment.
Figure 7B:
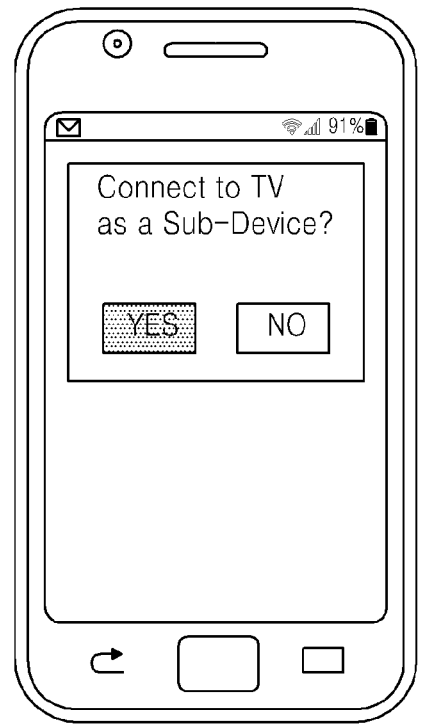
Figure 7C:
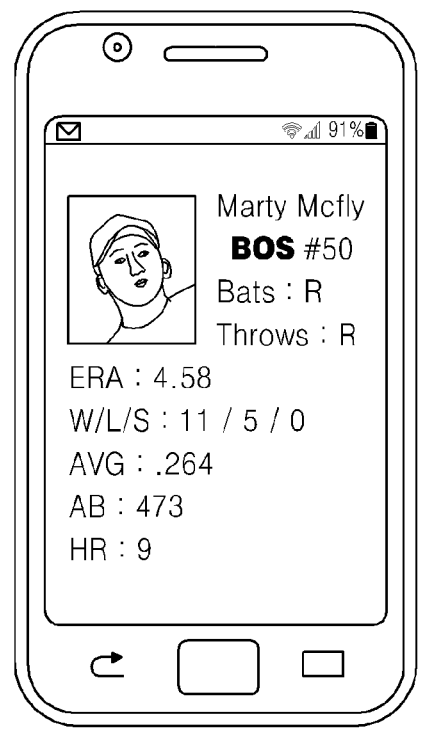

FIGS. 7a to 7c illustrate screens of the broadcast receiver and the sub device, according to an exemplary embodiment.

FIG. 7a illustrates a TV screen. As an example, in response to a trigger being received through a baseball game broadcast channel, the TV searches surrounding sub devices and displays candidate sub devices on a display, as shown in FIG. 7a. In response to a user selecting one of the candidate sub devices, a menu 720 asking the user whether to allow connection is displayed on a display of the corresponding sub device. In this menu 720, in response to the user selecting YES, the TV establishes a session with the sub device and transfers the ADO to the sub device.

In an exemplary embodiment, the ADO is an S-ADO specialized for a baseball name broadcast program and is an object which provides the user with information related to a hitter who is currently at bat. Accordingly, the ADO execution screen is displayed on the display of the sub device as shown in FIG. 7c. That is, the user may watch the baseball game broadcast through the TV and player-related information through the sub device.

Figure 8:
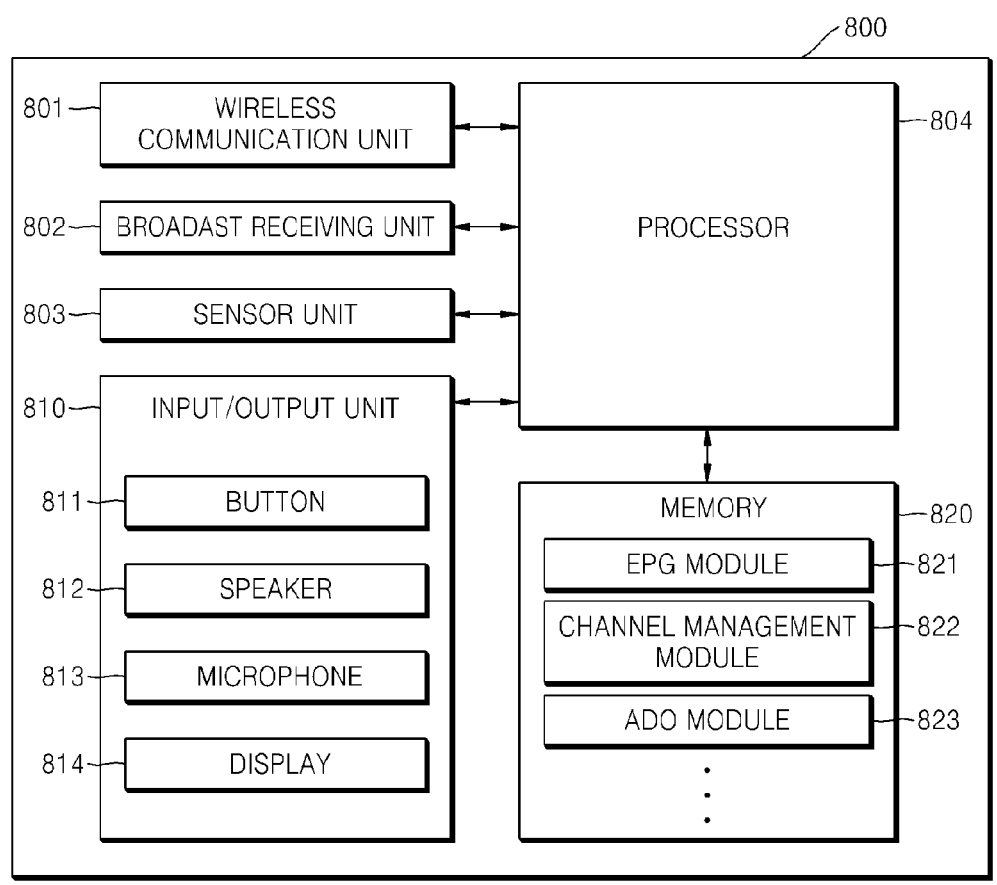
FIG. 8 illustrates a structure of a broadcast receiver according to an exemplary embodiment.

FIG. 8 illustrates a structure of the broadcast receiver according to an exemplary embodiment.

As illustrated in FIG. 8, the broadcast receiver 800 according to an exemplary embodiment includes a wireless communicator 801, a broadcast receiver 802, a sensor 803, a controller 804, an input/output 810 and a memory 820. FIG. 8 exemplifies a portion of components generally included in the broadcast receiver. It is obvious to a person skilled in the art that the broadcast receiver may further include components other than the components, as shown in FIG. 8.

The wireless communicator 801 performs a function of an Internet connection or a short-distance communication such as Bluetooth® or NFC.

The broadcast receiver 802 receives broadcast content and related ancillary data through a broadcast network.

The sensor 803 generally includes an infrared sensor receiving a remote control signal and may additionally include a proximity sensor which senses proximity of a human or a motion sensor which senses a motion of a human.

The input/output 810 provides an interface between an external device and a human and includes a button 811, a speaker 812, a microphone 813 and a display 814.

The controller 804 processes the ADO according to the exemplary embodiments by executing computer programs stored in the memory 820.

The computer programs stored in the memory 820 may be classified into a plurality of modules, such as an EPG module 821, a channel management module 822 and an ADO module 823, according to functions thereof.

The function of each module may be intuitively inferred by a person skilled in the art from the name, and thus only the ADO module 823 will be described here. In response to the broadcast receiver 800 determining a sub device which executes the ADO and the time becomes an ADO execution time, the ADO module 823 transfers the ADO to the sub device. For this, the ADO module 823 establishes a session with the sub device prior to the ADO execution time and transfers the ADO to the sub device in response to the time becoming the ADO execution time with reference to an ADO table, included in a trigger or an EPG.

The exemplary embodiments can be written as computer programs and can be implemented in general-use digital computers that execute the programs using a computer readable recording medium.

Examples of the computer readable recording medium include magnetic storage media (e.g., ROM, floppy disks, hard disks, etc.) and optical recording media (e.g., CD-ROMs, or DVDs), and storage media such as carrier waves (e.g., transmission through the Internet).

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of processing an Auxiliary Downloadable Object (ADO) by a broadcast receiver, the method comprising:
   receiving, by the broadcast receiver, broadcast content with information related to the ADO;
   analyzing the information related to the ADO to determine whether the ADO is a Predefined ADO (P-ADO) including information for using an ancillary service related to a broadcast company regardless of a kind of the broadcast content, or a Service-specific ADO (S-ADO) including information for using a specialized ancillary service in relation to the broadcast content;
   requesting, by the broadcast receiver, a broadcaster for the ADO in response to the determining that the ADO is the S-ADO;
   receiving, by the broadcast receiver, the ADO from the broadcaster in response to the requesting;
   retrieving the ADO from a storage in response to the determining that the ADO is the P-ADO that is stored in the storage before the receiving the broadcast content;
   displaying a list of devices supporting a resolution of a recommended resolution or more on a screen of the broadcast receiver;
   determining, by the broadcast receiver, a sub device for executing the ADO, according to a user's input, from among the devices; and
   transferring, by the broadcast receiver, the ADO to the sub device in response to a time becoming an execution time that is designated in an ADO table comprising the information related to the ADO and information related to the recommended resolution for the executing of the ADO,
   wherein the ADO is an object that provides an ancillary service associated with a broadcast service,
   wherein the ADO is an object that is not executed in the broadcast receiver but is transferred to the sub device and executed by the sub device,
   wherein the determining of the sub device is performed with reference to the information related to the recommended resolution, and
   wherein, when both the P-ADO and the S-ADO are transferred to the sub device for the broadcast content, the S-ADO is executed than the P-ADO, by the sub device.

2. The method according to claim 1, further comprising:
   establishing a session for transferring the ADO with the sub device prior to the execution time.

3. The method according to claim 1, further comprising:
   performing a command received through the ADO from the sub device,
   wherein the ADO comprises User Interface (UI) data that provides, to a user, a screen for controlling the broadcast receiver.

4. The method according to claim 1, wherein the ADO table is included in an Electronic Program Guide (EPG) or a trigger of the ADO.

5. The method according to claim 1, wherein the ADO table comprises information on whether the ADO is the P-ADO or the S-ADO.

6. The method according to claim 1, further comprising:
   selectively displaying an execution screen of the ADO with reference to the ADO table,
   wherein the ADO table comprises information on which one of the broadcast receiver and the sub device is used to display the ADO execution screen.

7. A broadcast receiver for processing an Auxiliary Downloadable Object (ADO), the broadcast receiver comprising:
   at least one memory; and
   a processor configured to execute at least one computer program stored in the at least one memory,
   wherein the at least one computer program comprises instructions for:
     receiving, by the broadcast receiver, broadcast content with information related to the ADO;
     analyzing the information related to the ADO to determine whether the ADO is a Predefined ADO (P-ADO) including information for using an ancillary service related to a broadcast company regardless of a kind of the broadcast content or a Service-specific ADO (S-ADO) including information for using a specialized ancillary service in relation to the broadcast content;

requesting, by the broadcast receiver, a broadcaster for the ADO in response to the determining that the ADO is the S-ADO;

receiving, by the broadcast receiver, the ADO from the broadcaster in response to the requesting;

retrieving the ADO from a storage in response to the determining that the ADO is the P-ADO that is stored in the storage before the receiving the broadcast content;

displaying a list of devices supporting a resolution of a recommended resolution or more on a screen of the broadcast receiver;

determining, by the broadcast receiver, a sub device for executing the ADO, according to a user's input, from among the devices; and transferring, by the broadcast receiver, the ADO to the sub device in response to a time becoming an execution time that is designated in an ADO table comprising the information related to the ADO and information related to the recommended resolution for the executing of the ADO, and wherein the ADO is an object that provides an ancillary service associated with a broadcast service, wherein the ADO is an object that is not executed in the broadcast receiver but is transferred to the sub device and executed by the sub device, wherein the determining of the sub device is performed with reference to the information related to the recommended resolution, and wherein, when both the P-ADO and the S-ADO are transferred to the sub device for the broadcast content, the S-ADO is executed than the P-ADO, by the sub device.

8. The broadcaster receiver according to claim 7, wherein the at least one program further comprises instructions for establishing a session to deliver the ADO with the sub device prior to the execution time.

9. The broadcaster receiver according to claim 7, wherein:
the at least one program further comprises instructions for executing commands received through the ADO from the sub device; and
the ADO comprises User Interface (UI) data that provides, to a user, a screen for controlling the broadcast receiver.

10. The broadcaster receiver according to claim 7, wherein the ADO table is included in an Electronic Program Guide (EPG) or a trigger of the ADO.

11. The broadcaster receiver according to claim 7, wherein the ADO table comprises information on whether the ADO is the P-ADO or the S-ADO.

12. The broadcaster receiver according to claim 7, wherein:
the at least one program further comprises instructions for selectively displaying an execution screen of the ADO with reference to the ADO table; and
the ADO table comprises information on which one of the broadcast receiver and the sub device is used to display the ADO execution screen.

13. A non-transitory computer-readable medium comprising a program thereon, wherein the program, when executed by a processor of a computer, causes the computer to execute the method of claim 1.

14. A system comprising a broadcast receiver and a sub device for processing an Auxiliary Downloadable Object (ADO), the system comprising:
the sub device configured to execute the ADO; and
the broadcast receiver comprising a processor configured to execute at least one computer program stored in at least one memory,
wherein the at least one computer program comprises instructions for:
receiving, by the broadcast receiver, broadcast content with information related to the ADO;
analyzing the information related to the ADO to determine whether the ADO is a Predefined ADO (P-ADO) including information for using an ancillary service related to a broadcast company regardless of a kind of the broadcast content or a Service-specific ADO (S-ADO) including information for using specialized ancillary service in relation to the broadcast content;
requesting, by the broadcast receiver, a broadcaster for the ADO in response to the determining that the ADO is the S-ADO;
receiving, by the broadcast receiver, the ADO from the broadcaster in response to the requesting;
retrieving the ADO from a storage in response to the determining that the ADO is the P-ADO that is stored in the storage before the receiving the broadcast content;
displaying a list of devices supporting a resolution of a recommended resolution or more on a screen of the broadcast receiver;
determining, by the broadcast receiver, the sub device configured to execute the ADO, according to a user's input, from among the devices; and
transferring, by the broadcast receiver, the ADO to the sub device in response to a time becoming an execution time that is designated in an ADO table comprising the information related to the ADO and information related to the recommended resolution for the executing of the ADO, and
wherein the ADO is an object that provides an ancillary service associated with a broadcast service,
wherein the ADO is an object that is not executed in the broadcast receiver but is transferred to the sub device and executed by the sub device,
wherein the determining of the sub device is performed with reference to the information related to the recommended resolution, and
wherein, when both the P-ADO and the S-ADO are transferred to the sub device for the broadcast content, the S-ADO is executed than the P-ADO, by the sub device.

15. The system of claim 14, wherein the broadcast receiver comprises the at least one memory.

16. The system of claim 14, wherein:
the at least one program further comprises instructions for executing commands received through the ADO from the sub device; and
the ADO comprises User Interface (UI) data that provides, to a user, a screen for controlling the broadcast receiver.

17. The system of claim 14, wherein the ADO table is included in an Electronic Program Guide (EPG) or a trigger of the ADO.

18. The system of claim 14, wherein the ADO table comprises information on whether the ADO is the P-ADO or the S-ADO.

19. The system of claim 14, wherein the sub device is further configured to directly communicate with a web server of the broadcast service through the ancillary service.

20. The method according to claim 1, wherein the execution time is when the ADO is to be transferred to the sub device.

21. The method according to claim 1, wherein the ADO table comprises an identifier of the ADO table, a version of the ADO table, a length of the ADO table, a number of ADOs associated with the broadcast service, an identifier of the broadcast service, an identifier of the ADO, connection information through which the ADO is received, and a value that indicates whether security is to be secured to execute the ADO.

* * * * *